United States Patent
Xu et al.

(10) Patent No.: US 12,046,769 B2
(45) Date of Patent: Jul. 23, 2024

(54) BATTERY STRUCTURE AND CARRIER VEHICLE

(71) Applicant: ZHEJIANG E-P EQUIPMENT CO., LTD., Huzhou (CN)

(72) Inventors: Hongpeng Xu, Huzhou (CN); Qichen Ma, Huzhou (CN); Jingsong Cao, Huzhou (CN)

(73) Assignee: ZHEJIANG E-P EQUIPMENT CO., LTD. (CN)

( * ) Notice: Subject to any disclaimer, the term of this patent is extended or adjusted under 35 U.S.C. 154(b) by 428 days.

(21) Appl. No.: 17/555,971

(22) Filed: Dec. 20, 2021

(65) Prior Publication Data

US 2023/0063691 A1 Mar. 2, 2023

(30) Foreign Application Priority Data

Aug. 30, 2021 (CN) .......................... 202122062216.9

(51) Int. Cl.
*H01M 50/249* (2021.01)
*H01M 50/256* (2021.01)
*H01M 50/262* (2021.01)
*H01M 50/543* (2021.01)

(52) U.S. Cl.
CPC ....... *H01M 50/249* (2021.01); *H01M 50/256* (2021.01); *H01M 50/262* (2021.01); *H01M 50/543* (2021.01); *H01M 2220/20* (2013.01)

(58) Field of Classification Search
CPC ............. H01M 50/249; H01M 50/262; H01M 50/543; H01M 50/256; H01M 2220/20
See application file for complete search history.

(56) References Cited

U.S. PATENT DOCUMENTS

| | | | |
|---|---|---|---|
| 1,655,744 A * | 1/1928 | Swanby | H01M 50/256 294/93 |
| 4,756,978 A | 7/1988 | Nitcher et al. | |
| 5,441,123 A | 8/1995 | Beckley | |
| 6,942,945 B2 * | 9/2005 | Andersen | H01M 50/262 429/97 |
| 8,413,947 B2 | 4/2013 | Chiang | |
| 9,475,513 B2 | 10/2016 | Liu et al. | |
| 9,586,605 B2 | 3/2017 | He et al. | |
| 9,718,661 B1 | 8/2017 | Hoffman | |
| D801,616 S | 10/2017 | Qichen et al. | |
| D805,712 S | 12/2017 | Qichen et al. | |
| 9,908,762 B1 | 3/2018 | Hongpeng et al. | |
| 9,966,712 B1 | 5/2018 | Hongpeng et al. | |
| D819,923 S | 6/2018 | Qichen et al. | |

(Continued)

*Primary Examiner* — James A Shriver, II
*Assistant Examiner* — Nicholas R. Kandas
(74) *Attorney, Agent, or Firm* — Cook Alex Ltd.

(57) ABSTRACT

The present disclosure relates to a battery structure and a carrier vehicle. The battery structure includes a battery main body, a plug component, and a handle. The handle is detachably connected to the top or the side of the battery main body. The plug component includes at least one plug end. The plug end can be plugged into the battery main body and the plug component is powered on when plugged into the battery. The handle is provided with a locking piece. When the handle is connected to the top of the battery main body, the locking piece is vertically docked for locking. When the handle is connected to the side of the battery main body, the locking piece is transversely docked for locking.

20 Claims, 7 Drawing Sheets

(56) References Cited

U.S. PATENT DOCUMENTS

| | | |
|---|---|---|
| D824,633 S | 7/2018 | Qichen et al. |
| 10,093,336 B2 | 10/2018 | Pan et al. |
| 10,538,422 B2 | 1/2020 | Lijian et al. |
| 10,730,728 B1 | 8/2020 | Qichen et al. |
| 10,836,620 B2 | 11/2020 | Jiandong et al. |
| 2007/0137904 A1 | 6/2007 | Rose et al. |
| 2009/0283346 A1* | 11/2009 | Katae ............... B60L 58/24 180/68.5 |
| 2010/0025126 A1 | 2/2010 | Nakatsu et al. |
| 2015/0102274 A1 | 4/2015 | He et al. |
| 2019/0322509 A1 | 10/2019 | Jianming et al. |

* cited by examiner

BATTERY STRUCTURE AND CARRIER VEHICLE

TECHNICAL FIELD

The present disclosure relates to the technical field of carriers, and in particular, to a battery structure and a carrier vehicle.

BACKGROUND

Electric carrier vehicles for material handling mainly include a front vehicle frame, a rear vehicle frame, a connecting rod component, an electric control unit, a hydraulic unit (including a lifting oil cylinder), an operating unit, a battery, a driving part, etc. The front vehicle frame, the rear vehicle frame, the connecting rod component, and the lifting oil cylinder form a main body frame structure of a vehicle, which is a main structural component for realizing lifting and transporting by the vehicle.

At present, components, such as a battery, a hydraulic station, and a controller, generally are assembled and arranged in a carriage of the front vehicle frame of a conventional electric carrier vehicle. The battery generally is fixedly mounted in a vehicle body and connected in a pluggable manner through a fixed power-on socket of the vehicle body. If the battery has a low charge or does not have electric power, the vehicle body needs to be driven or moved to a set charging location for charging.

It generally takes a long time to charge the battery fully and takes a certain amount of time and electric power to charge sufficiently to return to a working condition and location, which is extremely inconvenient. Therefore, a battery structure that is capable of being mounted in a carrier vehicle in a pluggable mode to serve as the vehicle power supply is needed.

Applicant previously applied a solution for a new battery structure in Chinese patent application no. 2021214317614. However, Applicant has found that mounting the battery structure on the vehicle body can be achieved by connecting and fixing in a manner set forth in the application, but the stability and smoothness of the connection, and the fixation strength during plugging and use do not reach desirable states. Therefore, a better solution is needed.

SUMMARY

An objective of the present disclosure is to provide a battery and a carrier vehicle, such as in the form of a pallet truck. A pluggable battery having a plug component is used to facilitate assembly of the carrier vehicle and improve the vehicle endurance or length of use. This disclosure includes example carrier vehicles that provide two plugging configurations involving different numbers of batteries, which may increase the endurance capability of the carrier vehicles and improves the connection and fixation strength for improved stability of the power from the battery or batteries.

In order to achieve the above-mentioned objectives, a main technical solution of the present disclosure includes a battery structure having a battery main body, a plug component, and a handle. The handle is detachably connected to the top or the side of the battery main body. The plug component includes at least one plug end. The plug end is received by the battery main body and the plug component is powered on by being plugged into the battery main body. The handle includes a locking piece. When the handle is connected to the top of the battery main body, the locking piece is vertically docked in the battery main body for locking. When the handle is connected to the side of the battery main body, the locking piece is transversely docked in the battery main body for locking.

In some embodiments, the locking piece includes an L-shaped elastically deformable piece and a hook body piece arranged on a free end of the L-shaped elastically deformable piece. The hook body piece is outward facing. The opposed end of the L-shaped elastically deformable piece is connected to the handle. When the handle is connected to the top of the battery main body, the free end is located at a side of the battery main body. When the handle is connected to the side of the battery main body, the free end is located at the top of the battery main body.

In some embodiments, one end of the handle on the top of the battery main body further comprises a recess that receives the connected end of the L-shaped elastically deformable piece and the handle is connected adjacent the one end of the top of the battery. An opposed end of the top of the battery further comprises a docking port configured for docking the plug end of the plug component.

In some embodiments, a convex edge is formed by an elongated protrusion extending vertically from a bottom end of one side of the battery main body upward to and transversely across a portion of the top of the battery main body. The convex edge is configured for connecting the handle to the battery main body. The docking port in the top of the battery main body is located between the opposed end of the top of the battery main body and the protrusion that forms the convex edge that extends transversely across the portion of the top of the battery main body.

In some embodiments, the plug component includes a holding piece, a plug bracket and two plug ends. The handle is connected to the side of the battery main body. Two opposite sides in the transvers direction of the plug bracket are respectively connected to a plug end. Two limiting plates are respectively and integrally formed on the two opposite sides in the transverse direction of the plug bracket and are respectively connected to a plug end. The two limiting plates are provided with a limiting port therebetween having a downwardly open gap.

A carrier vehicle is provided in combination with at least one of the battery structures, the carrier vehicle including a front vehicle frame. The front vehicle frame includes at least one longitudinally extending fork and a vertically extending vehicle body part. The carrier vehicle further includes a transversely extending supporting groove configured for supporting the at least one battery structure on an inner side wall of the vertically extending vehicle body part. An opening is formed in the vertically extending vehicle body part. A lock plate is arranged in the vertically extending vehicle body part. The handle is connected and to the battery main body of the at least one battery structure. The battery main body is plugged into the supporting groove from the opening in the vertically extending vehicle body part. The locking piece of the at least one battery structure docks with the lock plate in the vertically extending vehicle body part. The plug component of the at least one battery structure includes a plug end.

In some embodiments, one edge of the opening extends downwards to form the lock plate with a locking hole. The hook body piece of the battery structure is vertically plugged in from the opening and moves along a wall surface of the lock plate. During moving, the free end of the L-shaped elastically deformable piece is deformed toward a side of the battery main body and is restored when the hook body piece enters and is locked in the locking hole.

A carrier vehicle is further provided, including a front vehicle frame. The front vehicle frame includes a longitudinally extending fork and a vertically extending vehicle body part. The carrier vehicle further includes one or two battery structures. A transversely extending supporting groove is configured for supporting the one or two battery structures on an inner side wall of the vertically extending vehicle body part and a mounting guide rail is located above the supporting groove on the vertically extending vehicle body part. Lock holes are respectively formed in two ends of the mounting guide rail. Two mounting areas used for placing battery structures are formed between the supporting groove and the mounting guide rail. An opening is formed in the side of the vertically extending vehicle body part transversely opposite to each mounting area. The handle is connected to the side of the battery main body. The battery main body is transversely plugged in along the supporting groove from the opening until the hook body piece is docked with the lock hole. A through hole for the plug component to plug vertically is formed in each of the top end of the vertically extending vehicle body part and the mounting guide rail.

In some embodiments, after the hook body piece is transversely plugged in along the battery main body and is docked and is docked and locked in the lock hole, an end face of the handle located at the top of the battery is pressed against the end part of the mounting guide rail for positioning.

In some embodiments, one edge of the through hole of the mounting guide rail protrudes upward to form a guide plate. A convex hull is formed between an outward side wall of the guide plate and a triangular raised surface of the mounting guide rail. The convex hull guides the limiting port when plugging the plug component into the one or two battery structures.

Due to the adoption of the above technical solution, the present disclosure achieves the following effects: the battery structure is further optimized and the structure of the vertical vehicle body part is changed, so as to improve the stability and the connection strength of the battery mounted in the vertical vehicle body part. This also improves the endurance time of the vehicle, reduces situations wherein the vehicle cannot be used due to the failure of the battery or a charger, and ensures continuity of operations. When there are double batteries plugged into the vehicle, the vehicle can operate in an environment far away from a charging room and/or for longer durations. In addition, different assembly modes of the batteries can meet the requirements of different vehicles and battery structures.

Figure 1:
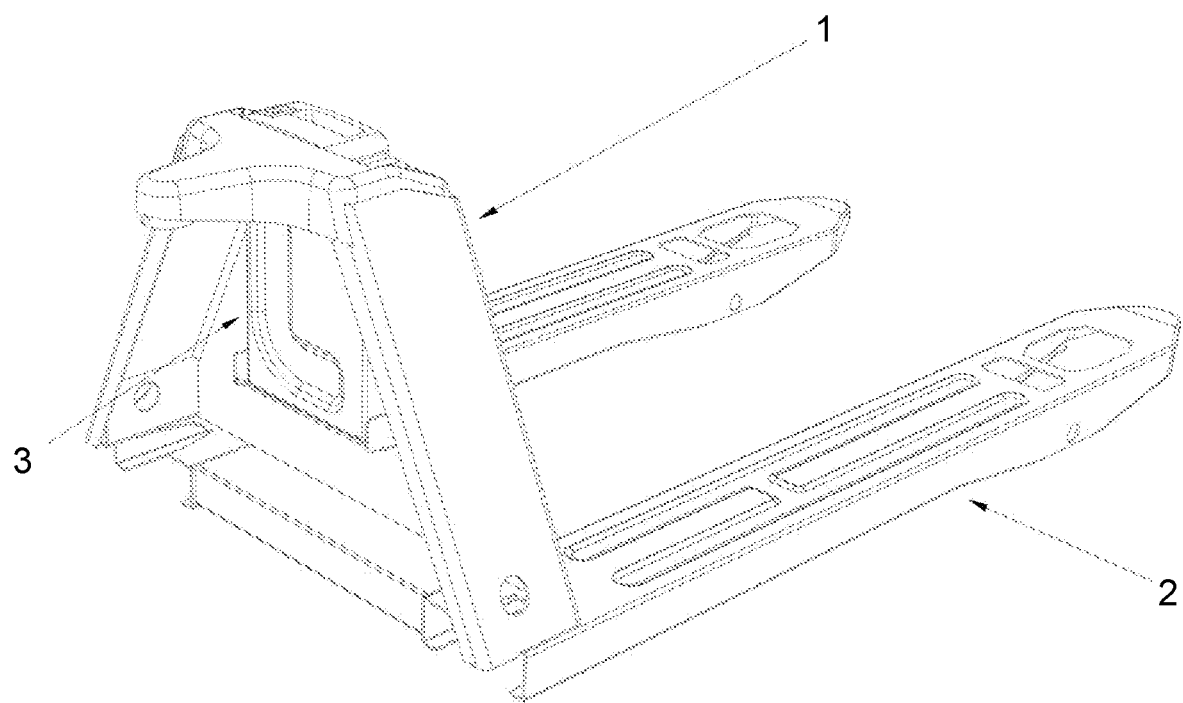
FIG. 1 is a perspective rear schematic structural diagram of one example of a carrier vehicle.

The figures include: vertical vehicle body part 1, transverse fork tooth part 2, battery structure 3, handle 31, docking port 32, L-shaped elastically deformable piece, hook body piece 34, convex edge 35, battery main body 36, supporting groove 4, opening 5, lock plate 6, buckle hole 61, mounting guide rail 7, lock hole 71, through hole 72, guide plate 73, convex hull 74, plug component 8, limiting plate 81, holding piece 82, limiting port 83 and plug bracket 84.

DETAILED DESCRIPTION OF THE EMBODIMENTS

Preferred embodiments in the following description are merely for example, and those skilled in the art will appreciate that the application is only limited by the claims herein. The principles of the present disclosure in the following description may be applied with variations without deviating from the spirit and scope of the present disclosure.

It should be understood that, in the present disclosure, orientations or positional relationships indicated by the terms "longitudinal", "transverse", "upper", "lower", "front", "back", "left", "right", "vertical", "horizontal", "top", "bottom", "inside", "outside", etc. are orientations or positional relationships shown based on the accompanying drawings. Such terms are merely for facilitating describing the example embodiments and simplifying the description, rather than indicating or implying that the devices or elements must have particular orientations, and be constructed and operated in particular orientations. Thus, they are not to be construed as limitations within the present disclosure.

It will be appreciated that the term "one" should be understood to mean "at least one" or "one or more", i.e., in one embodiment, the number associated with one element may be one, while in another embodiment, the number associated with one element may be multiple, and the term "one" should not be understood as a limitation of quantity.

Figure 2:
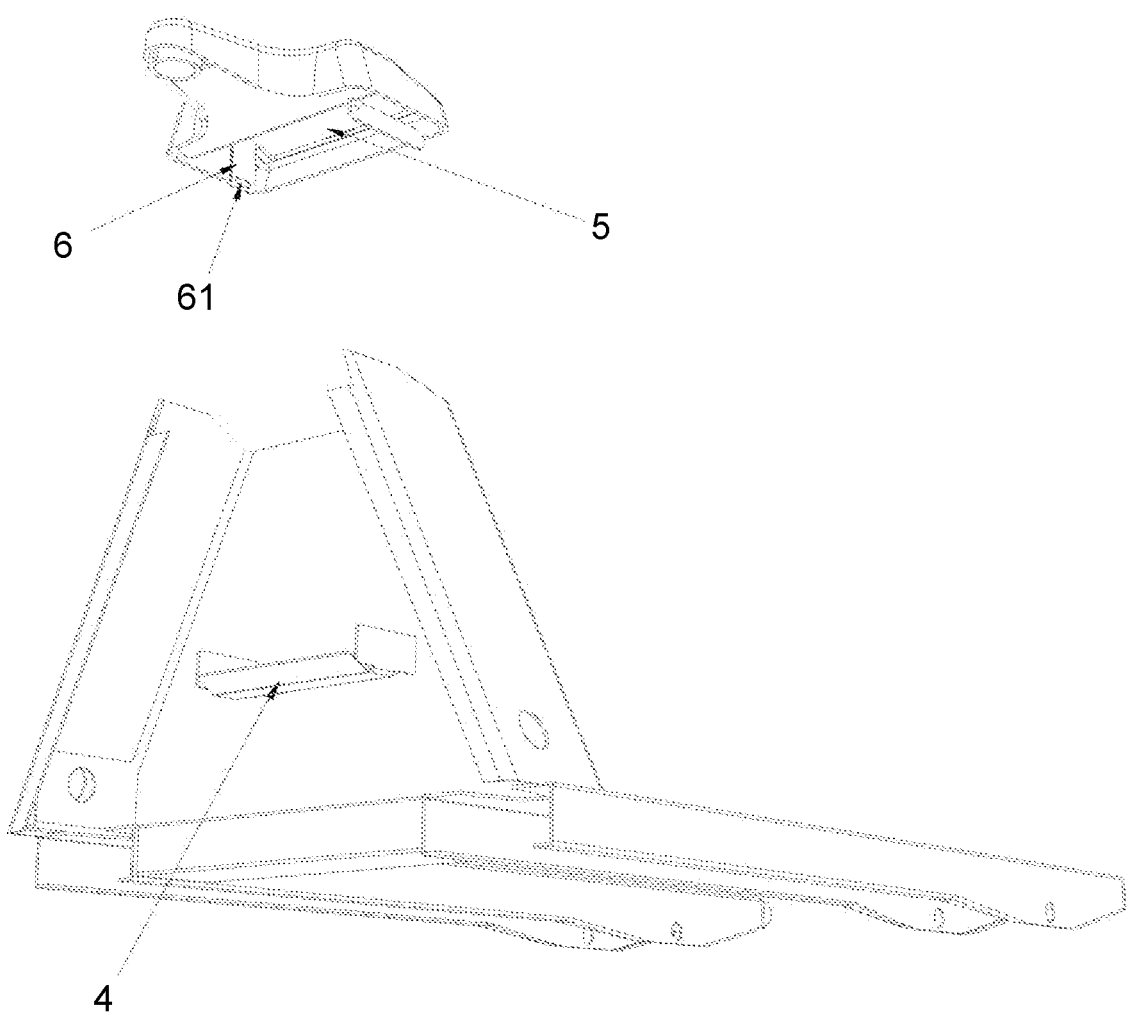
FIG. 2 is a perspective rear schematic structural diagram of internal structures of a vertical vehicle body part of the embodiment of FIG. 1.
Figure 3:
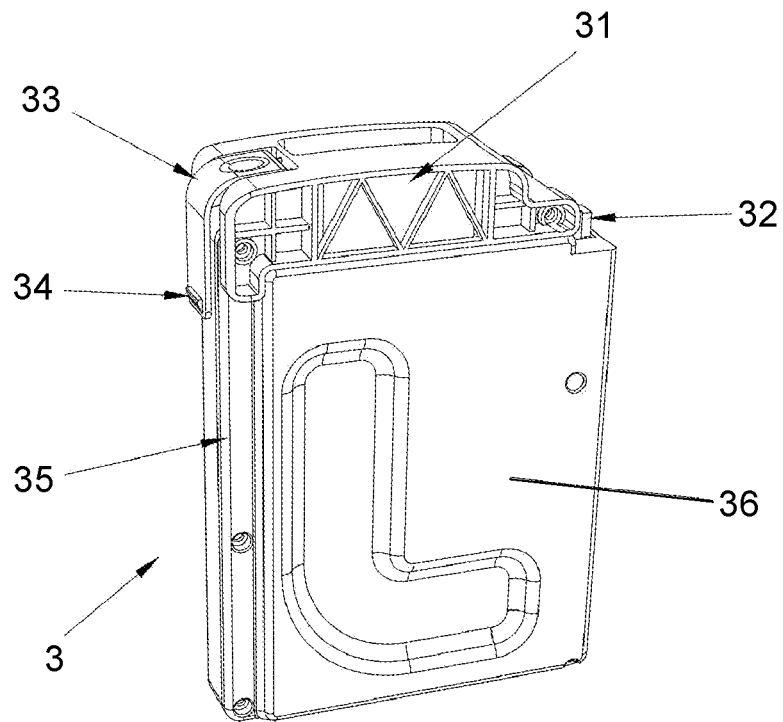
FIG. 3 is a perspective rear schematic structural diagram of a battery structure of the embodiment of FIG. 1.
Figure 4:
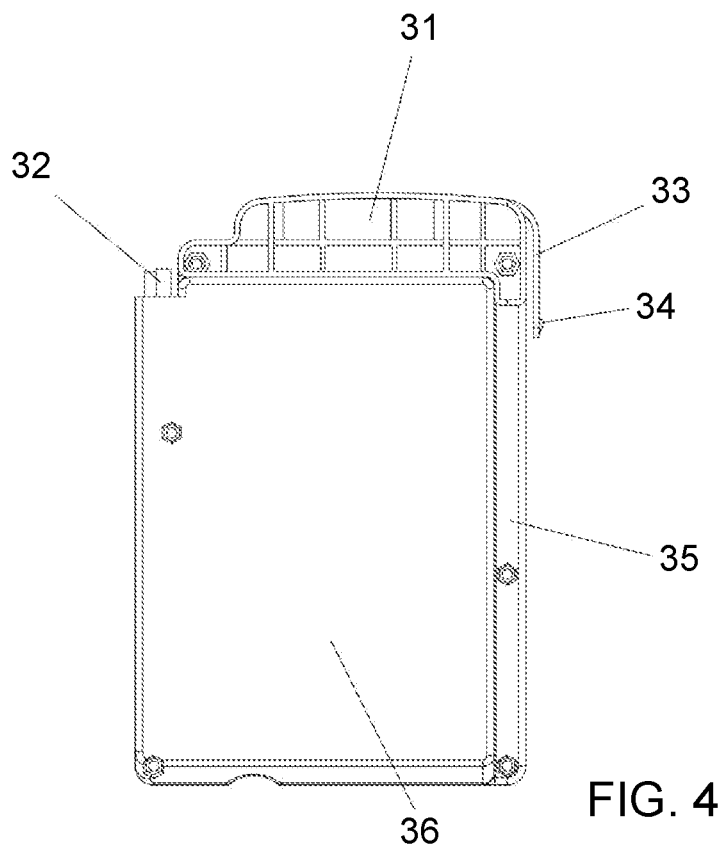
FIG. 4 is a front schematic structural diagram of the embodiment of FIG. 3.
Figure 5:
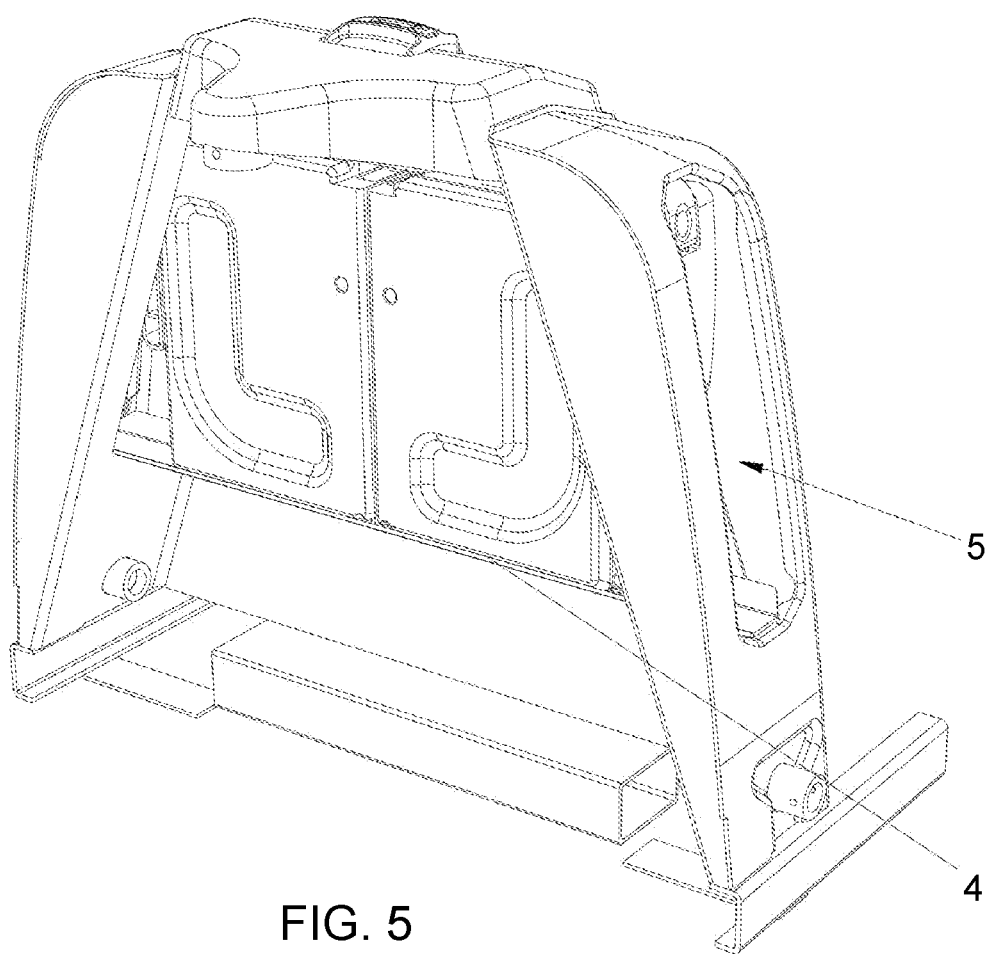
FIG. 5 is a perspective rear schematic structural diagram of a vehicle body part of another example carrier vehicle.
Figure 6:
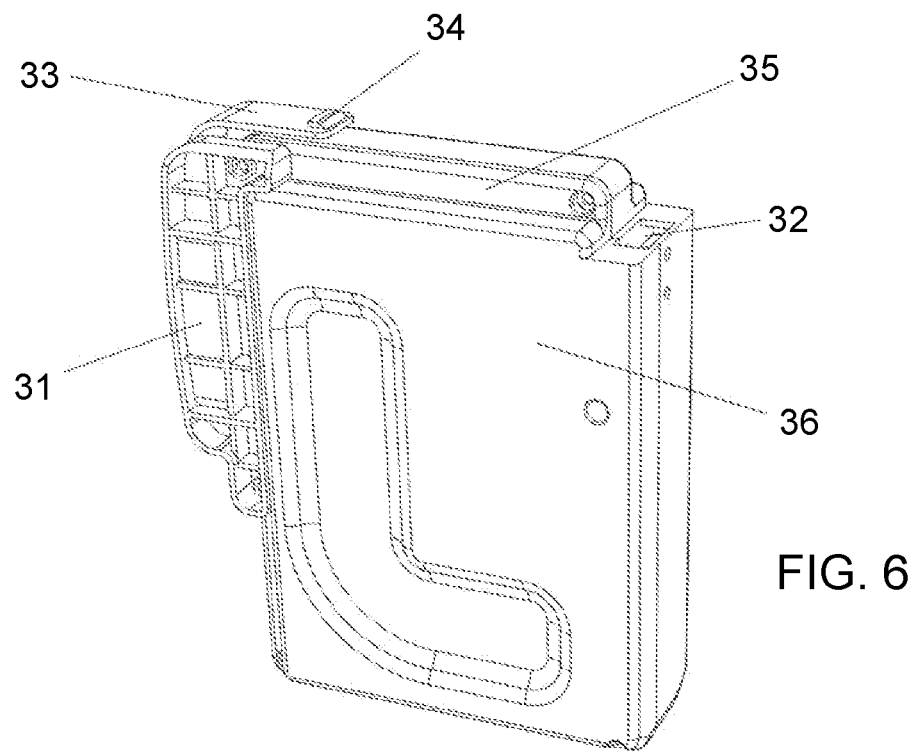
FIG. 6 is a perspective rear schematic structural diagram of one of the battery structures of the embodiment of FIG. 5.
Figure 7:
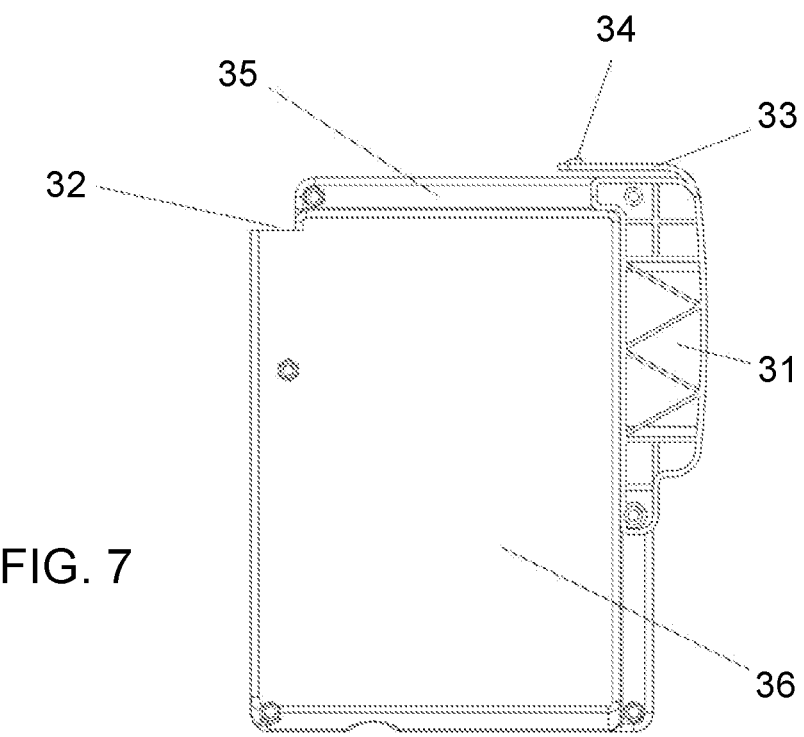
FIG. 7 is a front schematic structural diagram of the embodiment of FIG. 6.
Figure 8:
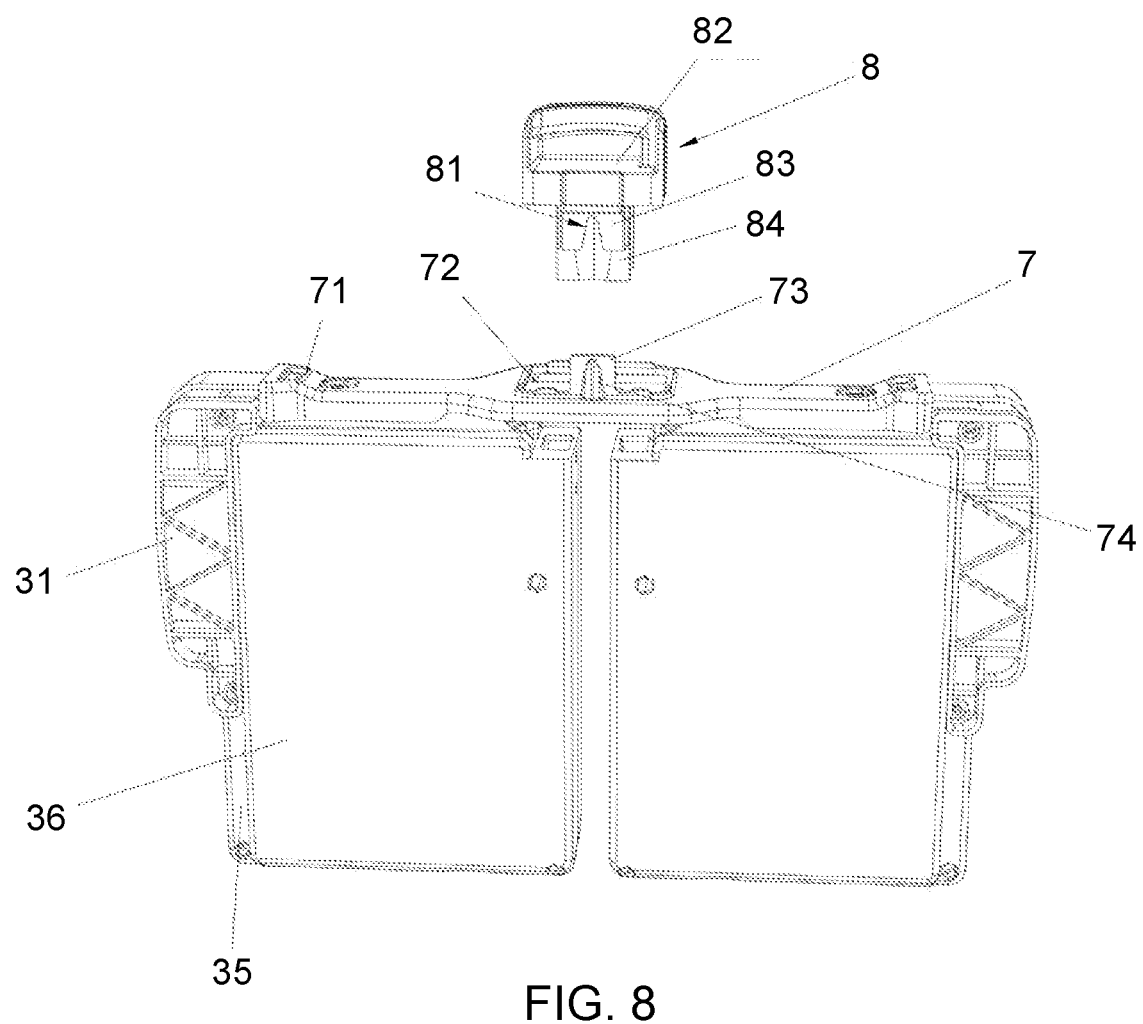
FIG. 8 is a perspective front schematic structural diagram of an assembly of a mounting guide rail and battery structures of the embodiment of FIG. 5.
Figure 9:
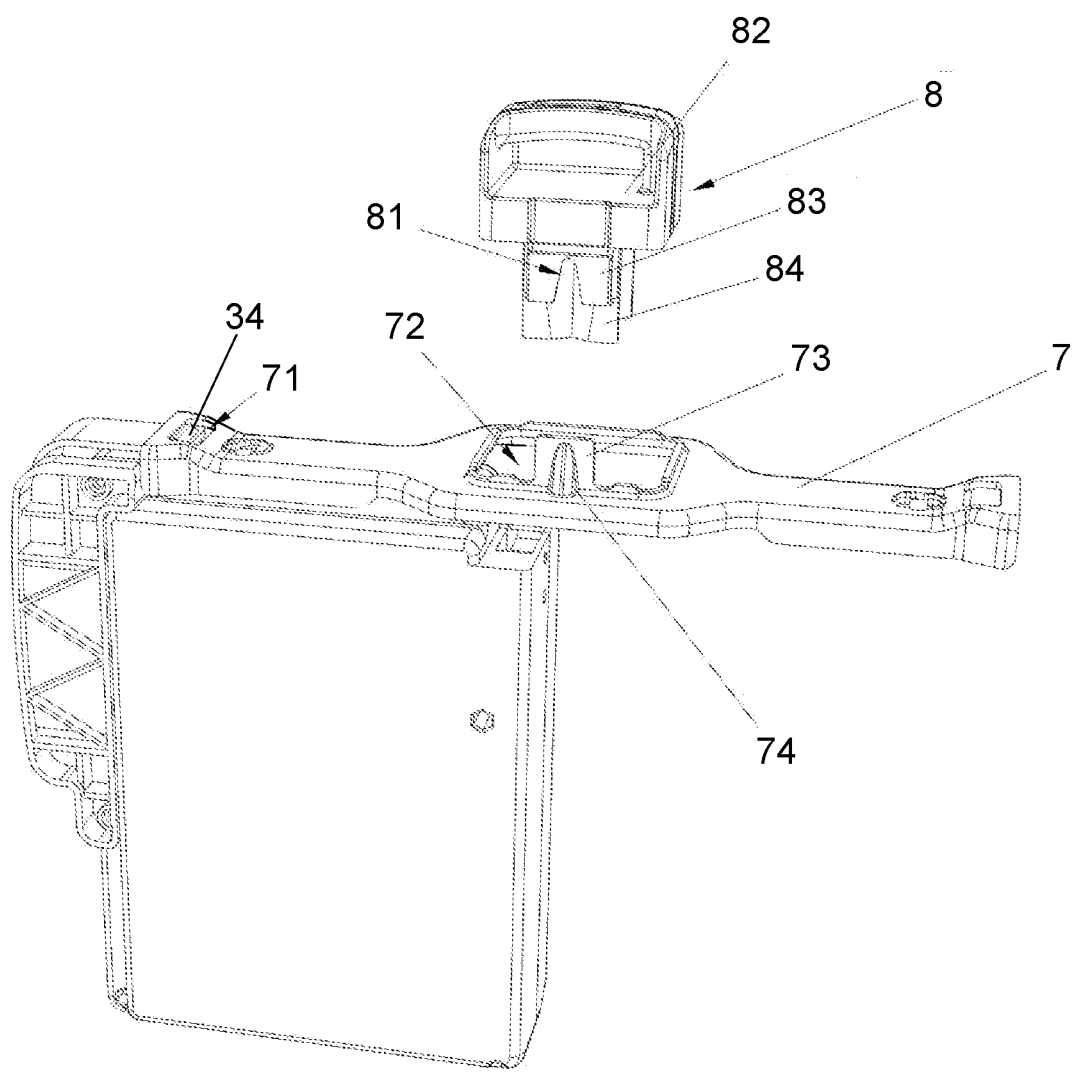
FIG. 9 is a partially exploded perspective front schematic structural diagram of the assembly of the mounting guide rail and one of the battery structures of the embodiment of FIG. 8.

Referring to FIGS. 1-9, the present disclosure shows a battery structure 3 according to a preferred embodiment of the present disclosure. The battery structure 3 is mainly applied to a carrier vehicle, such as in the form of a pallet truck, and provides a power supply for the carrier vehicle. The battery structure 3 has a plugging mode, i.e., the battery structure 3 may be detached from the carrier vehicle and may be loaded or inserted into the carrier vehicle after being fully or partially charged.

The battery structure 3 of the present technical solution has advantages in that the plugging smoothness and the docking strength of the battery main body 36 to the carrier vehicle are improved, and the battery main body 36 may be mounted in the carrier vehicle stably. Specifically, the battery structure 3 includes a battery main body 36, a plug component 8, and a handle 31. The handle 31 is detachably connected to the top or the side of the battery main body 36. The plug component 8 includes at least one plug end. The plug end may be plugged into the battery main body 36 and the plug component is powered "on" by plugging the plug end of the plug component 8 into the vehicle.

The handle 31 is provided with a locking piece. When the handle 31 is connected to the top of the battery main body 36, the locking piece is vertically docked for locking. When the handle 31 is connected to the side of the battery main body 36, the locking piece is transversely docked for locking. The above-mentioned locking piece permits two different plugging directions based on different mounting positions of the handle 31 on the battery main body 36. The plugging direction actually is changed according to different structures of the carrier vehicle. Two carrier vehicle structures will be further described herein.

In the embodiments shown in FIGS. 1-9, the locking piece includes an L-shaped elastically deformable piece 33 and a hook body piece 34 arranged at a free end of the L-shaped elastically deformable piece 33. The end of the L-shaped elastically deformable piece 33 that is connected to the handle 31 is a closed end. When the handle 31 is connected to the top of the battery main body 36, as with the example in FIGS. 1-4, the free end of the L-shaped elastically deformable piece 33 is located at the side of the battery main body 36. When the handle 31 is connected to the side of the battery main body 36, as with the example of FIGS. 5-9, the free end is located at the top of the battery main body 36.

The L-shaped elastically deformable piece 33 may be constructed of a bent iron sheet or plate, or other suitable elastically deformable materials, with the bend preferably being arc-shaped to follow the contour of the handle 31 and battery main body 36. A hook body piece 34 is arranged on a free end of the L-shaped elastically deformable piece 33 and outward facing. The hook body piece 34 preferably includes an arc-shaped ramp to provide for smooth entry and sliding to reach a locked position. In the example shown in FIGS. 1-4, the free end is parallel to the side of the battery main body 36, while in the example shown in FIGS. 5-9 the free end is parallel to the top of the battery main body 36.

One end of the handle 31 on the top of the battery main body 36 includes a recess that receives the connected end of the L-shaped elastically deformable piece 33 and the handle 31 is connected adjacent one end of the top of the battery main body 36. An opposed end of the top of the battery main body 36 further includes a docking port 32 configured for docking the plug end of the plug component 8.

A convex edge 35 is formed by an elongated protrusion extending vertically from a bottom end of one side of the battery main body 36 upward to and transversely across a portion of the top of the battery main body 36. The convex edge 35 is configured for connecting the handle 31 to the battery main body 36. The docking port 32 in the top of the battery main body 36 is located between the opposed end of the top of the battery main body 36 and the protrusion that forms the convex edge 35 that extends transversely across the portion of the top of the battery main body 36.

The handle 31 also is L-shaped to extend around an upper corner of the battery main body 36. The middle of the handle 31 includes a groove extending in the direction of the L-shaped elastically deformable piece 33. The convex edge 35 is embedded into the groove when the handle 31 is connected to the battery main body 36. The arrangement of the convex edge advantageously provides an area used for connecting the handle 31 to the battery main body 36, which is easily distinguishable and acts as a guide when locating the handle 31 on the battery main body 36. In addition, the handle 31 is connected in this manner to improve the stability of the connection and docking port 32 allows the L-shaped elastically deformable piece 33 to deform during sliding insertion of the battery structure 3 into the carrier vehicle.

The plug component 8 includes a holding piece 82, a plug bracket 84, and two plug ends. The handle 31 is connected to the side of the battery main body 36. Two opposite sides in the transverse direction of the plug bracket 84 are respectively connected to a plug end. Two limiting plates 81 are respectively and integrally formed on the two opposite side in the transverse direction of the plug bracket 84. The two limiting plates 81 are provided with a limiting port 83 therebetween having a downwardly open gap. Of course, the plug component 8 also may have only one plug end, which may be implemented as needed according to the structures of different carrier vehicles. The limiting port 83 between the limiting plates 81 is mainly used for guiding the plugging of the plug component 8, which is further described in combination with the structure of an example carrier vehicle.

The disclosure provides two different carrier vehicles having associated plugging directions and battery structures, which are further described herein. Each carrier vehicle includes a front vehicle frame. The front vehicle frame includes at least on longitudinally extending fork 2 and a vertically extending vehicle body part 1. The structure of the remainder of the vehicles is not shown for ease of viewing the present subject matter and may be consistent with known structures. In the examples, the difference between the two carrier vehicles is with respect to solutions that have a battery main body 36 that receives a battery structure 3 that is plugged vertically into the vertically extending vehicle body part 1 or is plugged transversely into the vertically extending vehicle body part 1.

In the first solution, only one of the above-mentioned battery structures 3 is utilized. Specifically, a supporting groove 4 is transversely arranged on an inner side wall of the vertically extending vehicle body part 1. The supporting groove 4 is used for supporting the battery main body 36. The handle 31 is connected to the top of the battery main body 36. Therefore, based on the above, a free end of the L-shaped elastically deformable piece 33 is located at a side of the battery main body 36. An opening 5 is formed in the top end of the vertically extending vehicle body part 1. The battery main body 36 is vertically plugged in through the opening 5 until the bottom of the battery main body 36 is placed in the supporting groove 4.

A lock plate 6 is arranged in the vertically extending vehicle body part 1. After the battery main body 36 is plugged into the supporting groove 4 vertically, the locking piece is docked with the lock plate 6, so that the battery main body 36 can be connected and removably securely held in the interior of the vertically extending vehicle body part 1. In the first example, one edge of the opening 5 extends downward and forms the lock plate 6 with a locking hole 61. The hook body piece 34 is vertically plugged in from the opening 5 and moves along a surface of the lock plate 6, wherein the free end of the L-shaped elastically deformable piece bends or is deformed toward a side of the battery main body 36 and is restored when the hook body piece 34 enters and is locked in the locking hole 61.

Of course, in some other embodiments, the lock plate 6 also may be arranged on the inner wall of the vertically extending vehicle body part 1. However, if such a configuration is adopted, because of the hook body piece 34 being arranged on the L-shaped elastically deformable piece 33, there would be a need to be docked with the docking hole 61 with relatively high accuracy. Instead, by adopting the present configuration, there is a low accuracy requirement. The battery main body 36 may be docked with the carrier vehicle successfully only by moving in the direction of the lock plate 6, so the assembly is very convenient. The plug component 8 includes a plug end. Only one plug end is used in this arrangement due to the fact that only one battery main body 36 can accept the plug end.

The other solution of the second example includes two similar battery structures 3 arranged respectively to be transversely plugged in and mounted inside the vertically extending vehicle body part 1. Specifically, in this solution, a supporting groove 4 used for supporting at least one battery structure 3 and a mounting guide rail 7 located above the supporting groove 4 are transversely arranged on an inner side wall of the vertically extending vehicle body part 1. Lock holes 71 are respectively formed in two ends of the mounting guide rail 7. Two mounting areas used for placing batteries are formed between the supporting groove 4 and the mounting guide rail 7. An opening 5 is formed in each side of the vertically extending vehicle body part 1 transversely opposite to each mounting area. Both the opening 5 in each side of the second example and the opening 5 in the above-mentioned first example solution are used for plugging a battery main body 36 into the vertically extending vehicle body part 1.

The difference between the opening 5 in the side and the above-mentioned opening 5 in the top is the opening direction. The battery main body 36 is transversely plugged along the supporting groove 4 from the opening 5 of the second example until the hook body piece 34 is docked with the lock hole 71. In the second solution, the handle 31 is connected to the side of the battery main body 36. Therefore, the free end of the L-shaped elastically deformable piece 33 is located at the top of the battery main body 36, and the locking piece is transversely docked with the mounting guide rail 7.

A through hole 72 for the plug component 8 to plug vertically in the second example is formed in the top end of the vertically extending vehicle body part 1 and in the corresponding mounting guide rail 7. The difference between the through hole 72 and the above-mentioned opening 5 is that the above-mentioned opening 5 is used for the plugging and unplugging of the battery main body 1, and the through hole 72 is used for the plugging and unplugging of the plug component 8. The plug component 8 includes two plug ends. Because two battery main bodies 36 are arranged to be located in the vertically extending vehicle body part 1, one of the two plug ends serves as a primary plug end, and the other end of the two plug ends serves as a secondary plug end. But a circuit is only arranged in the primary end, so the primary plug end is plugged with one of the battery main bodies 36 and the battery main body 36 provides power supply power first, and the battery main body 36 plugged into the secondary plug end serves as backup power storage. When the battery that provides the power supply power runs out, then the plug component 8 is overturned 180° to plug the primary plug end into the backup battery main body 36, which can improve the endurance capability, prevent the vehicle from being unusable due to a failure of a battery or a charger, and ensure the continuity of operation.

Although, in this embodiment, two battery main bodies 36 are mounted on the front vehicle frame. In an actual application process, only one battery main body 36 may be mounted according to the needs of a user. In addition, in order to improve the plug accuracy of the plug component 8, in this embodiment, one edge of the through hole 72 of the mounting guide rail 7 protrudes upwards to form a guide plate 73. A convex hull 74 is formed between an outward side wall of the guide plate 73 and a triangular raised surface of the mounting guide rail 7; and the convex hull 74 guides the limiting port 83 when plugging the plug component 8 into the one or two battery structures 3. The convex hull 74 guides the plugging of the limiting port 83 and thereby can guide accurate docking of the whole plug component 8. In addition, after the hook body piece 34 is transversely plugged along the battery main body 36 and is docked and moves into the locking hole 71, the end face of the handle 31 located at the top of the battery is pressed against the end of the mounting guide rail 7. The structure can further improve the connection strength between the locking piece and the mounting guide rail 7. When it is necessary to release the hook body piece 34 from the locking hole 71, it may be accomplished by pressing the L-shaped elastically deformable piece 33, so that the hook body piece 34 at the free end of the L-shaped elastically deformable piece 33 becomes unlocked from the locking hole due to the bending and deforming of the L-shaped elastically deformable piece 33.

In addition, the bottom of the battery main body 36 in the embodiment may be of an inverted trapezoidal structure or a horizontal plane. If the inverted trapezoidal structure is adopted, the shape of the supporting groove 4 may be a complementary raised V-shaped structure. If the horizontal plane is adopted, the bottom groove of the supporting groove 4 also may be a horizontal plane. In a further alternative embodiment, a limiting baffle block may be arranged in the middle of the supporting groove 4, and the limiting baffle block may more clearly divide the supporting groove 4 into two mounting areas.

It should be understood by those skilled in the art that the embodiments of the present disclosure shown in the above-mentioned description and accompanying drawings are merely examples and are not intended to limit the present disclosure or claims.

The invention claimed is:

1. A battery structure, comprising a battery main body (36) having a docking port (32), a removable plug component (8), and a handle (31), wherein the handle (31) is detachably connected to the top or the side of the battery main body (36); the plug component (8) comprises at least one plug end; the plug end is removably received by the docking port (32) in the battery main body (36) and the plug component (8) is powered on by being plugged into the docking port (32) in the battery main body (36); the handle (31) further comprises a locking piece; when the handle (31) is connected to the top of the battery main body (36), the locking piece is vertically docked in an opening of the battery main body for locking, and when the handle (31) is connected to the side of the battery main body (36), the locking piece is transversely docked in an opening of the battery main body for locking.

2. The battery structure according to claim 1, wherein the locking piece comprises an L-shaped elastically deformable piece (33) and a hook body piece (34) arranged on a free end of the L-shaped elastically deformable piece (33); the hook body piece (34) is outward facing; the opposed end of the L-shaped elastically deformable piece (33) is connected to the handle (31); wherein when the handle (31) is connected to the top of the battery main body (36), the free end of the L-shaped elastically deformable piece (33) is located at a side of the battery main body (36), and when the handle (31) is connected to the side of the battery main body (36), the free end of the L-shaped elastically deformable piece (33) is located at the top of the battery main body (36).

3. The battery structure according to claim 2, wherein one end of the handle (31) on the top of the battery main body (36) further comprises a recess that receives the connected end of the L-shaped elastically deformable piece (33) and the handle is connected adjacent one end of the top of the battery main body (36), and an opposed end of the top of the battery main body (36) further comprises the docking port (32) configured for docking the plug end of the plug component (8).

4. The battery structure according to claim 3, wherein a convex edge (35) is formed by an elongated protrusion extending vertically from a bottom end of one side of the battery main body (36) upward to and transversely across a portion of the top of the battery main body (36); the convex edge (35) is configured for connecting the handle (31) to the battery main body (36); and wherein the docking port (32) in the top of the battery main body (36) is located between the opposed end of the top of the battery main body (36) and the protrusion that forms the convex edge (35) that extends transversely across the portion of the top of the battery main body (36).

5. The battery structure according to claim 1, wherein the plug component (8) comprises a holding piece (82), a plug bracket (84), and two plug ends; the handle (31) is connected to the side of the battery main body (36); two opposite sides in the transverse direction of the plug bracket (84) are respectively connected to a plug end; two limiting plates (81) are respectively and integrally formed on the two opposite sides in the transverse direction of the plug bracket (84); and wherein the two limiting plates (81) are provided with a limiting port (83) therebetween having a downwardly open gap.

6. The battery structure according to claim 2, wherein the plug component (8) comprises a holding piece (82), a plug bracket (84), and two plug ends; the handle (31) is connected to the side of the battery main body (36); two opposite sides in the transverse direction of the plug bracket (84) are respectively connected to a plug end; two limiting plates (81) are respectively and integrally formed on the two opposite sides in the transverse direction of the plug bracket (84); and wherein the two limiting plates (81) are provided with a limiting port (83) therebetween having a downwardly open gap.

7. The battery structure according to claim 3, wherein the plug component (8) comprises a holding piece (82), a plug bracket (84), and two plug ends; the handle (31) is connected to the side of the battery main body (36); two opposite sides in the transverse direction of the plug bracket (84) are respectively connected to a plug end; two limiting plates (81) are respectively and integrally formed on the two opposite sides in the transverse direction of the plug bracket (84); and wherein the two limiting plates (81) are provided with a limiting port (83) therebetween having a downwardly open gap.

8. The battery structure according to claim 4, wherein the plug component (8) comprises a holding piece (82), a plug bracket (84), and two plug ends; the handle (31) is connected to the side of the battery main body (36); two opposite sides in the transverse direction of the plug bracket (84) are respectively connected to a plug end; two limiting plates (81) are respectively and integrally formed on the two opposite sides in the transverse direction of the plug bracket (84); and wherein the two limiting plates (81) are provided with a limiting port (83) therebetween having a downwardly open gap.

9. A carrier vehicle in combination with at least one battery structure according to claim 1, the carrier vehicle comprising a front vehicle frame; the front vehicle frame comprising at least one longitudinally extending fork (2) and a vertically extending vehicle body part (1); a transversely extending supporting groove (4) is configured for supporting the at least one battery structure on an inner side wall of the vertically extending vehicle body part (1); an opening (5) is formed in the vertically extending vehicle body part (1); a lock plate (6) is arranged in the vertically extending vehicle body part (1); the handle (31) is connected to the battery main body (36) of the at least one battery structure; the battery main body (36) is plugged into the supporting groove (4) from the opening (5) in the vertically extending vehicle body part; the locking piece of the at least one battery structure docks with the lock plate (6) in the vertically extending vehicle body part; and the plug component (8) of the at least one battery structure comprises a plug end.

10. A carrier vehicle in combination with at least one battery structure of claim 9, wherein the opening (5) is located in a top of the vertically extending vehicle body part.

11. A carrier vehicle in combination with at least one battery structure of claim 10, wherein the battery main body (36) is vertically plugged into the supporting groove (4) through the opening (5).

12. A carrier vehicle in combination with at least one battery structure of claim 9, wherein the opening (5) is located in a side wall of the vertically extending vehicle body part.

13. A carrier vehicle in combination with at least one battery structure of claim 12, wherein the battery main body (36) is transversely plugged into the supporting groove (4) through the opening (5).

14. The carrier vehicle according to claim 9, wherein one edge of the opening (5) extends downward to form the lock plate (6) further comprising a locking hole (61); a hook body piece (34) of the battery structure is vertically plugged in from the opening (5) and moves along a wall surface of the lock plate (6), wherein the free end of the L-shaped elastically deformable piece (33) is deformed toward a side of the battery main body (36) and is restored when the hook body piece (34) enters and is locked in the locking hole (61).

15. A carrier vehicle in combination with at least one battery structure according to claim 2, the carrier vehicle comprising a front vehicle frame; the front vehicle frame comprising at least one longitudinally extending fork (2) and a vertically extending vehicle body part (1); a transversely extending supporting groove (4) is configured for supporting the at least one battery structure on an inner side wall of the vertically extending vehicle body part (1); an opening (5) is formed in the vertically extending vehicle body part (1); a lock plate (6) is arranged in the vertically extending vehicle body part (1); the handle (31) is connected to the battery main body (36) of the at least one battery structure; the battery main body (36) is plugged into the supporting groove (4) from the opening (5) in the vertically extending vehicle body part; the locking piece of the at least one battery structure docks with the lock plate (6) in the vertically extending vehicle body part; and the plug component (8) of the at least one battery structure comprises a plug end.

16. A carrier vehicle in combination with at least one battery structure according to claim 3, the carrier vehicle comprising a front vehicle frame; the front vehicle frame comprising at least one longitudinally extending fork (2) and a vertically extending vehicle body part (1); a transversely extending supporting groove (4) is configured for supporting the at least one battery structure on an inner side wall of the vertically extending vehicle body part (1); an opening (5) is formed in the vertically extending vehicle body part (1); a lock plate (6) is arranged in the vertically extending vehicle body part (1); the handle (31) is connected to the battery main body (36) of the at least one battery structure; the battery main body (36) is plugged into the supporting groove (4) from the opening (5) in the vertically extending vehicle body part; the locking piece of the at least one battery structure docks with the lock plate (6) in the vertically extending vehicle body part; and the plug component (8) of the at least one battery structure comprises a plug end.

17. A carrier vehicle, comprising a front vehicle frame, wherein the front vehicle frame comprises at least one longitudinally extending fork (2) and a vertically extending vehicle body part (1); the carrier vehicle further comprises one or two battery structures (3) according to claim 1; a transversely extending supporting groove (4) is configured for supporting the one or two battery structures on an inner side wall of the vertically extending vehicle body part and a mounting guide rail (7) is located above the supporting groove (4) on the vertically extending vehicle body part; lock holes (71) are respectively formed in two ends of the mounting guide rail (7); two mounting areas used for placing battery structures are formed between the supporting groove (4) and the mounting guide rail (7); an opening (5) is formed in the side of the vertically extending vehicle body part (1) transversely opposite to each mounting area; the handle (31) is connected to the side of the battery main body (36); the battery main body (36) is transversely plugged in along the supporting groove (4) from the opening (5) until the hook body piece (34) is docked with the lock hole (71); and a through hole (72) for the plug component (8) to plug vertically is formed in each of the top end of the vertically extending vehicle body part (1) and the mounting guide rail (7).

18. The carrier vehicle according to claim 17, wherein after the hook body piece (34) is transversely plugged in along the battery main body (36) and is docked and locked in the lock hole (71), an end face of the handle (31) located at the top of the battery is pressed against an end part of the mounting guide rail (7) for positioning.

19. A carrier vehicle, comprising a front vehicle frame, wherein the front vehicle frame comprises at least one longitudinally extending fork (2) and a vertically extending vehicle body part (1); the carrier vehicle further comprises one or two battery structures (3) according to claim 5; a transversely extending supporting groove (4) is configured on for supporting the one or two battery structures on an inner side wall of the vertically extending vehicle body part and a mounting guide rail (7) is located above the supporting groove (4) on the vertically extending vehicle body part; lock holes (71) are respectively formed in two ends of the mounting guide rail (7); two mounting areas used for placing batteries are formed between the supporting groove (4) and the mounting guide rail (7); an opening (5) is formed in the side of the longitudinal vehicle body part (1) transversely opposite to each mounting area; the handle (31) is connected to the side of the battery main body (36); the battery main body (36) is transversely plugged in along the supporting groove (4) from the opening (5) until the hook body piece (34) is docked with the lock hole (71); and a through hole (72) for the plug component (8) to plug vertically is formed in each of the top end of the vertically extending vehicle body part (1) and the mounting guide rail (7).

20. The carrier vehicle according to claim 19, wherein one edge of the through hole (72) of the mounting guide rail (7) protrudes upward to form a guide plate (73); a convex hull (74) is formed between an outward side wall of the guide plate (73) and a triangular raised surface of the mounting guide rail (7); and the convex hull (74) guides the limiting port (83) when plugging the plug component (8) into the one or two battery structures (3).

* * * * *